United States Patent [19]

DeBenedictis et al.

[11] 4,205,348
[45] May 27, 1980

[54] LASER SCANNING UTILIZING FACET TRACKING AND ACOUSTO PULSE IMAGING TECHNIQUES

[75] Inventors: Leonard C. DeBenedictis, Los Angeles; Richard V. Johnson, Pasadena, both of Calif.

[73] Assignee: Xerox Corporation, Stamford, Conn.

[21] Appl. No.: 922,259

[22] Filed: Jul. 5, 1978

[51] Int. Cl.² .......................... H04N 1/04; H01J 3/14
[52] U.S. Cl. .................................. 358/285; 358/293; 358/264; 358/296; 350/285; 350/6.7; 250/236
[58] Field of Search ............... 358/285, 293, 264, 289, 358/292, 296; 250/234, 236; 350/285, 6.7, 6.8

[56] References Cited
U.S. PATENT DOCUMENTS

| | | | |
|---|---|---|---|
| 3,835,249 | 9/1974 | Dattilo et al. | 358/285 |
| 3,997,722 | 12/1976 | Bardos | 358/285 |

Primary Examiner—John C. Martin
Assistant Examiner—Edward L. Coles
Attorney, Agent, or Firm—Irving Keschner

[57] ABSTRACT

Method and apparatus for improving the efficiency and resolution of laser scanning systems using a multi-faceted rotating polygon as the scanner device. In particular, an acousto-optic Bragg cell is utilized as an active optical element to both modulate, in response to an electrical input signal, and deflect an incident laser beam so that the modulated beam is caused to follow, or track, one facet of the scanner during a complete scan and to shift to the adjacent facet for the following scan. The scanning system is operated in a manner wherein during recording the image of the acoustic pulses at the surface of a recording medium are made to move at the same relative velocity, in the opposite direction, as the velocity of the laser recording, or write beam whereby imaging of the input electrical signal on the recording medium surface is accomplished without blurring.

19 Claims, 11 Drawing Figures

START OF SCAN
FIG. 5a

MIDDLE OF SCAN
FIG. 5b

END OF SCAN
FIG. 5c

LASER SCANNING UTILIZING FACET TRACKING AND ACOUSTO PULSE IMAGING TECHNIQUES

BACKGROUND OF THE INVENTION

The use of laser scanning techniques for printing information on laser sensitive mediums have been disclosed in the prior art. For example, U.S. Pat. No. 3,922,485 disclosed a multifaceted polygon optical scanner which scans a modulated laser beam across a xerographic medium. In order to print on the laser sensitive medium (i.e. the xerographic drum shown in the aforementioned patent), a laser of a particular output power is required. For example, the photoreceptor which comprises the xerographic medium disclosed in the aforementioned patent requires a laser flux of one milliwatt incident thereon to discharge predetermined charged areas of the photoreceptor to accomplish printing. In order to reduce the power requirements on the input laser which in turn, would reduce its cost and size, the prior art has sought to optimize laser efficiency or, in other words, the efficiency of the optical system such that maximum laser beam power is provided on the photoreceptor for a given input laser rated at a certain output power. One approach has been the optimization of the key components which comprise the optical system such as the modulator, polygon scanner and other major optical elements. However, the optical system reaches a certain point where efficiency does not increase. It has been found that typically optical scanning system efficiencies are on the order of ten percent so that a ten milliwatt laser is required to apply one milliwatt of power on the photoreceptor. The impact of this performance is to require system designers to stress the laser power capability which in turn can effect the projected reliability, life, manufacturing cost, development cost, and field operational costs.

It should be noted that the inefficiency of some of the components in the system is due to the contamination of various optical surfaces as well as glass-air interface light power losses. The surface losses of each optical element in the system effects the transmission of each element and cumulatively effects the efficiency of the overall scanning system. Further, in scanning systems which require more than one facet to be illuminated in order to reduce retrace times, such as that disclosed in the aforementioned patent, reduced system efficiencies are the result since only one beam from one facet can be utilized at a time. Generally, in order to provide a relatively uniform amount of light across the scan line, the beam illuminating the scanner facets is expanded to fully illuminate the facets. The end result of the beam expansion is that the percentage of light which can get through the scanner, even if the surfaces thereof were perfect reflectors, is severely reduced. The problem inherent in illuminating two facets could be minimized by using a scanner facet dimension large compared to the optical beam at the polygon in the scan direction. Although this may be viable in a low resolution system or for a low speed scanner which can tolerate a large polygon dimension, this approach cannot be tolerated for high resolution systems or for high speed scanners.

The aforementioned disadvantages have been corrected by the system disclosed in copending application Ser. No. 785,258 filed Apr. 6, 1977, now U.S. Pat. No. 4,170,028, and assigned to the assignee of this application. As disclosed therein, an active optical element is utilized to deflect the incident laser beam so as to follow one facet during a complete scan and shift to the next facet for the following scan. The active optical element in low and high bandwidth systems preferably is an acousto-optic Bragg cell used to both modulate and deflect an incident laser beam.

Unless compensated for, motion blur problems can arise in those forms of optical data records, such as the laser scanning systems described hereinabove, in which there is significant relative movement between the recording medium and the focused laser writing beam incident thereon. Reduction of motion blur by the use of very fast electro-optic modulators is possible, but that technique tends to be rather costly. State-of-the-art acousto-optic modulators are not effective in many potential applications because of the practical limitations in the rise time of the modulator which is imposed by the transit time of the acoustic wavefront across the laser beam, thereby reducing or severely limiting the response of the modulator to high speed input video information. A technique for reducing the bandwidth and rise time limitations associated with the use of state-of-the-art acousto-optic modulators in an optical data recording system by reimaging the motion of the acousto-optic pulse onto a recording medium thereby greatly increasing the effective bandwidth of the acousto-optic modulator and reducing any blurring of the image formed on the surface of the recording medium is disclosed in copending application Ser. No. 920,314, filed June 28, 1978. In the embodiment in which a rotating scanner device and a xerographic recording medium are utilized, selection of the system magnification between the modulator and the recording medium to be subtantially equal to the ratio of the velocity of the scanning laser writing beam, to the velocity of the acoustic wave front in the acousto-optic modulator causes the acoustic pulse (which essentially contains the video information) to be reimaged onto the surface of the recording medium in a manner whereby the acoustic pulse follows the recording surface and permits an isomorphic mapping of the video signal to the recording medium without blurring.

The first concept described hereinabove enables high optical throughput efficiency to minimize the required laser power. However, system resolution performance, although satisfactory for most purposes, is less than desired in applications which require high resolution in the output produced by the system. It should be noted that the resolution in prior art scanning systems which do not utilize the facet tracking concept are minimally affected by the inherent pulse imaging presence occurring in acousto-optic modulators, the effects being capable of being compensated for by techniques known to the prior art. However, when facet tracking is utilized, the effects become important and should be utilized to improve system resolution. Additionally, existing acousto-optic modulators are effectively non-responsive to very high video data rates.

The second concept (without facet tracking) described hereinabove improves the system resolution by minimizing image blur and reduces sensitivity of the system to laser beam wander. However, the translational motion of the polygon facet introduces a distortion of the laser beam exposure profile which varies along the length of the scan line being recorded, the output copy being produced thereby being less than ideal.

It has been determined that although both concepts can be utilized separately in laser scanning applications and provide satisfactory results, the combination of both concepts in the same laser scanning system enables system performance to be substantially upgraded to a degree which cannot be realized by implementing each concept separately.

SUMMARY OF THE PRESENT INVENTION

The present invention provides method and apparatus for increasing the efficiency and resolution of laser scanning systems which utilize a rotating scanner, such as a multifaceted polygon, as the scanner to scan a laser beam across the surface of a recording medium. In particular, an active optical element is utilized to deflect the incident laser beam so as to follow one scanner facet during a complete scan and shift to the next facet for the following scan. The active optical element in low and high bandwidth systems preferably is an acousto-optic Bragg cell used to both modulate and deflect an incident laser beam. The system magnification between the Bragg cell and the recording medium is selected to be substantially equal to the ratio of the velocity of the recording, or writing, laser beam to the velocity of the sound wave in the Bragg cell, the acoustic pulses in the Bragg cell being reimaged onto the surface of the recording medium in a manner whereby image blur is minimized by tracking the surface of the recording medium with a moving image of the input, or video, signal stream applied to the Bragg cell.

It is an object of the present invention to provide method and apparatus for increasing the efficiency and resolution of a laser scanning system.

It is a further object of the present invention to provide method and apparatus for increasing the efficiency and resolution of a laser scanning system, the printing power requirements on the input laser being substantially reduced.

It is still an object of the present invention to increase the light transmission efficiency and resolution of a laser scanning system which utilizes a rotating multifaceted polygon as the scanner.

It is yet another object of the present invention to provide method and apparatus for increasing the light transmission efficiency and resolution of a laser scanning system which utilizes a rotating multifaceted polygon as the scanner, an active optical element being utilized to deflect the laser beam so as to follow one facet during a complete scan and shifting the laser beam to the adjacent facet for the following scan.

It is a further object of the present invention to provide method and apparatus for increasing the light transmission efficiency and resolution of a laser scanning system which utilizes a rotating multifaceted polygon as the scanner, an acousto-optic modulator being utilized to deflect a modulated laser beam so as to follow one facet during a complete scan and shifting the laser beam to the adjacent facet for the following scan. The system magnification between the acousto-optic modulator and a recording medium is selected to be substantially equal to the ratio of the velocity of the scanning laser writing beam to the velocity of the acoustic wavefront in the acousto-optic modulator whereby the modulator acoustic pulses are reimaged onto the surface of the recording medium in a manner whereby the acoustic pulses move at substantially the same velocity but in the opposite direction of the writing laser beam and permits an isomorphic mapping of the video signal stream applied to the modulator onto the recording medium without blurring.

In summary, the laser scanning system of the present invention combines the best features of the active facet tracking and pulse imaging configurations disclosed in the aforementioned copending applications, the improved system having high light throughput efficiency and system resolution.

DESCRIPTION OF THE DRAWINGS

For a better understanding of the invention, as well as other objects and features thereof, reference is made to the following description which is to be read in conjunction with the accompanying drawings wherein.

DESCRIPTION OF THE PREFERRED EMBODIMENT

Figure 1:
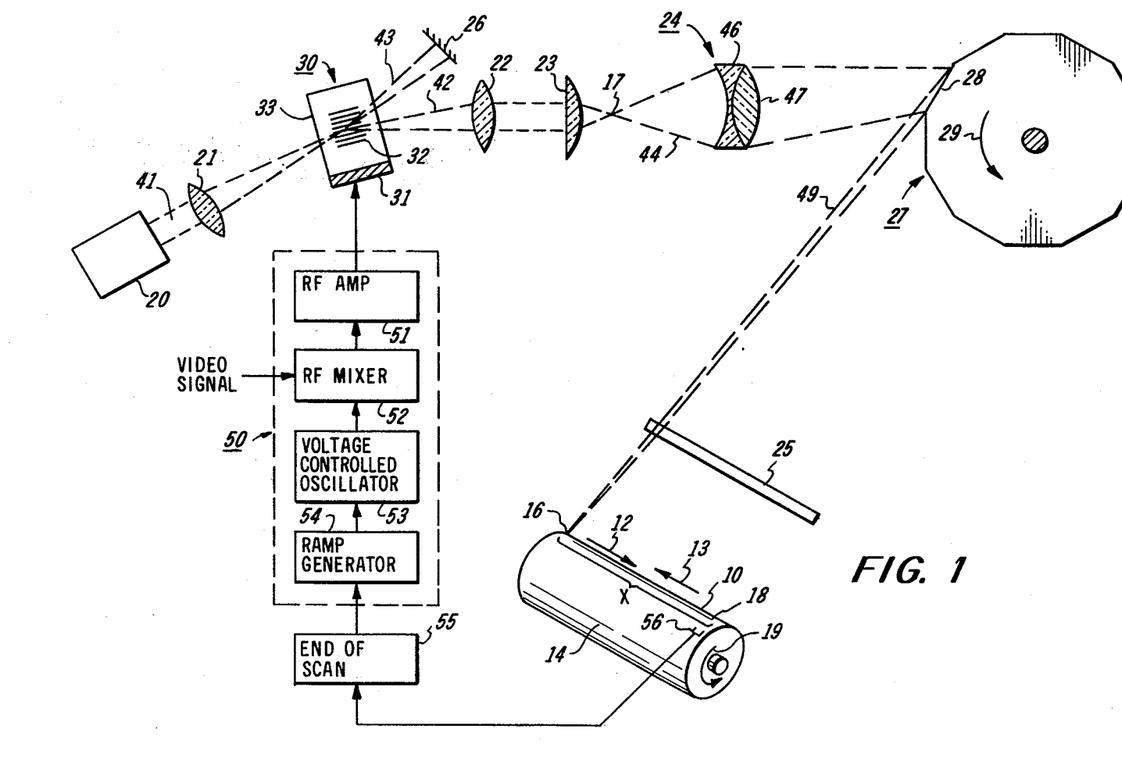
FIG. 1 is a partial schematic diagram of a preferred embodiment of the optical scanning system of the present invention at the start of scan position.

Referring now to FIG. 1, a partial schematic diagram of the improved optical scanning system of the present invention at the start of scan position is illustrated. The optical portion of the schematic shows the scanning system at the beginning of a scan line 10, the scan line 10 being in the direction of arrow 12 along the surface of a medium 14 which is sensitive to the laser flux utilized in the system. It is assumed that the scan line 10 starts at point 16 on the surface of medium 14, the scan line 10 being along a width x, i.e. from point 16 to point 18. As shown, medium 14 is preferably a xerographic drum which is rotated in the direction of arrow 19 to provide the Y direction of scan. A light source 20 provides the original light beam 41 for utilization by the scanning system. The light source 20 is preferably a helium-cadmium or helium-neon laser. It is to be understood that the aforementioned lasers are cited as examples and that any light source which generates a collimated beam of monochromatic light may be used. The laser which generates a collimated beam of monochromatic light may easily be modulated by an active optical element, acousto-optic modulator 30, in conformance with the information contained in an electrical input signal, such as a video signal, applied to the modulator controller as will be set forth hereinafter. A lens 21 is provided to focus the beam 41 onto the modulator 30.

Figures 3, 8:
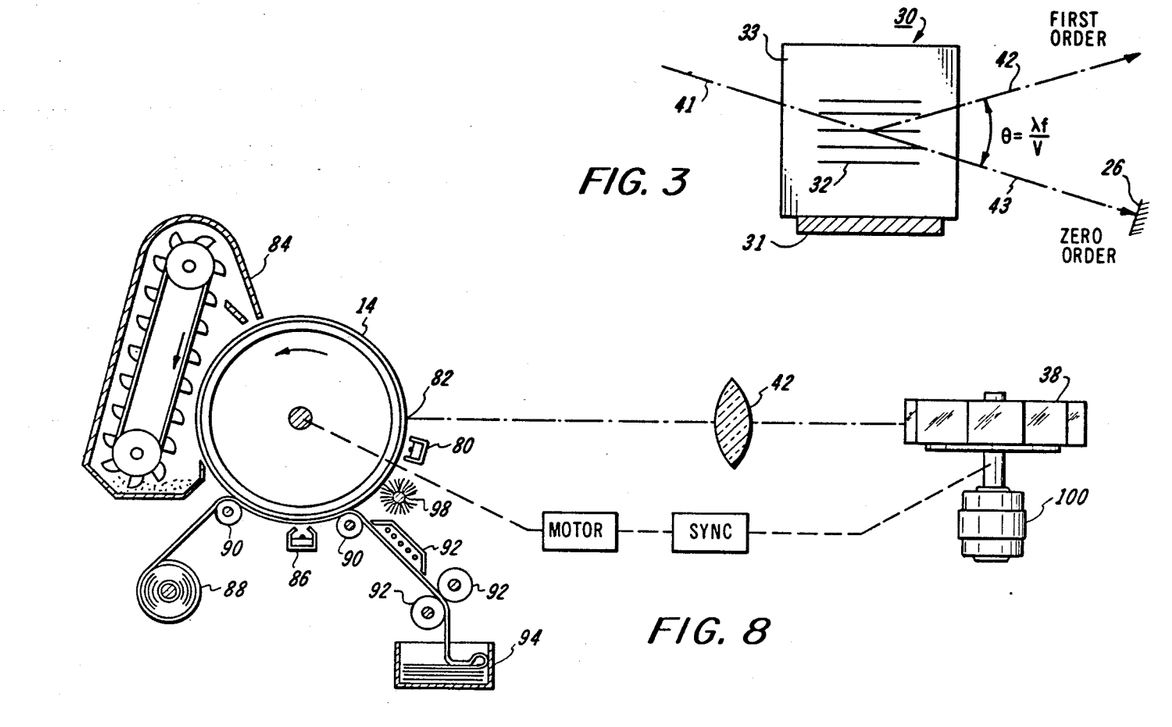
FIG. 3 is a schematic diagram of the active optical element used in the present invention.
FIG. 8 shows a portion of the scanning system of the present invention being utilized to print information on a laser sensitive medium.

FIG. 3 illustrates in schematic form the active optical element which may be used in the present invention. The element 30 in an acousto-optic Bragg cell or, as it is more commonly called, an acousto-optic modulator (hereinafter referred to as modulator). The modulator 30 comprises an electrically driven piezoelectric transducer 31, such as lithium nobate, bonded to an acousto-optic material 33 which may be glass, plastic, or crystal such as a single tellurium dioxide (TeO$_2$) crystal. The transducer 31 in response to an electrical drive signal generates an acoustic-wave which travels through the material, perturbing the index of refraction and acting as phase grating 32, the grating period being equal to the drive or acoustic frequency. Grating density (ability of grating to modify the phase front of light beam) is proportional to the amplitude of the drive signal applied to the transducer 31. The wavefronts are segmented by the video signal characteristics, and for a video signal comprising a stream of "1"s and "0"s, it is assumed that the spacing between segmented wavefronts is determined by the "0" time of the video signal although the "1" time can be utilized.

A beam of light 41 is applied to the modulator. Without a signal applied to the transducer 31, only a non-diffracted output beam 43 exists. Application of a signal to the transducer produces two significant output beams, a first-order diffracted beam 42 and a zero-order non-diffracted beam 43. In the present invention, the first-order beam is the output, while the zero-order beam is absorbed by a beam stop 26 (the zero-order beam may be utilized as the output if desired). The intensity of the output beams is a function of the amplitude of the drive signal applied to the transducer.

An angle $\theta$ which represents the angle of diffraction exists between the first-order and zero-order beams. The angle $\theta$ is directly proportional to the drive frequency, the wavelength of the incident laser light and inversely proportional to the velocity of propagation V of the acoustic pulses in modulator 30. Therefore, this angle can be changed by varying the frequency of the drive signal applied to the transducer 31. An example of a modulator which may be used in the present invention is disclosed in U.S. Pat. No. 3,938,881.

With reference again to FIG. 1, the first-order beam 42 is positioned at the output of modulator 30 as shown, passes through a recollimating lens 22, and is then incident on cylindrical lens 23 having power in the tangential (direction of scan) direction. Cylindrical lens 23 expands beam 42 into a beam 44 which is incident on optical element 24 which has a magnification level $M_1$ associated therewith. In the embodiment shown, optical element 24 comprises two elements, a biconcave element 46 and a second convex lens 47 cemented to biconcave lens element 46. Optical element 24 is configured to form an image of the acoustic pulses in modulator 30, as set forth hereinbelow, onto the surface of the recording medium 14. Although not shown, the magnification $M_1$ of optical element 24, which also may comprise a single lens element, may be selected to be variable over a predetermined range in a manner known in the optical magnification art. The lens elements 23 and 24 and the distance therebetween are selected such that the beam portion 49 at the output of lens 24 is directly incident onto a facet 28 of rotating multifaceted polygon 27 and thereafter focused as scan line 10 proximate the surface of recording medium 14. Preferably facet 28 is fully illuminated along its width by the beam 48 as shown or the beam 48 can be compressed to a small spot on the facet 28.

The rotational axis of polygon 27 is orthogonal or nearly orthogonal to the plane in which light beams 42 travels. The facets of the polygon 27 are mirrored surfaces for the reflection of any illuminating light impinging upon them. With the rotation of the polygon 27 in the direction shown by arrow 29, light beam 49 is reflected from illuminated facet 28 and rotated and translated through a scan angle for flying spot scanning. As will be set forth hereinafter in more detail, facet 28 (and each facet thereafter) is completely tracked during the scan of each scan line 10.

The beam portion 49 reflected from facet 28 passes through a cylindrical lens 25 which has power only in the sagittal direction (orthogonal to the direction of scan), beam portion 49 being focused at point 16 on surface of medium 14 as shown.

A control circuit 50 provides the drive signal to the modulator 30. The control circuit comprises a linear ramp generator 54 which provides a signal to a voltage controlled oscillator 53. The output of the oscillator 53 is constant in amplitude with frequency dependent upon the voltage level applied to its input, the output of oscillator 53 being applied one input of mixer 52. The electrical video signal is applied to the other input of mixer 52. The output of the mixer is amplified by amplifier 51 and then applied as a drive signal to transducer 31.

Figure 4:
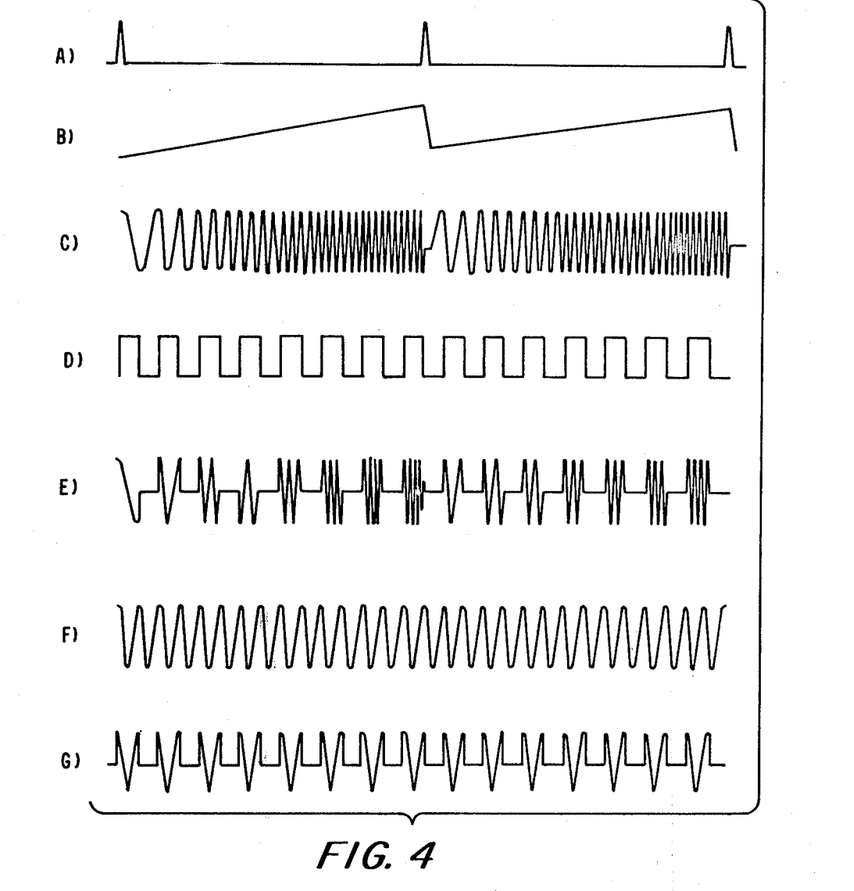
FIG. 4 is a wave form diagram for use in explaining the operation of the present invention.

The operation of the present invention will be described with reference to FIGS. 1 and 4. In order to provide facet tracking, the acoustic carrier frequency must vary in time synchronism with the scanning action at the surface of the recording medium. An end of scan detector 56 which may be any type of photodetector produces an output pulse (FIG. 4a) when light beam 49 is at point 18, the end of scan. The output pulse is sensed by a end of scan device 55, which may be any conventional switching device, to turn on the ramp generator 54. In essence, the end of scan detector 56 is used to trigger the modulator drive electronics 50 to provide aforementioned required synchronism. When the ramp generator is turned on, it generates a linear ramp of increasing voltage until the next end of scan is detected. At this point the output from the generator drops to zero and a new linear ramp is generated. The waveform produced by the ramp generator 54 for two scans is shown in FIG. 4b. It should be noted that a start of scan detector and an associated start of scan device can be utilized to trigger modulator drive electronics 50 to provide system synchronism. In this case, the duration of the linear ramp depends on the time it takes for one scan. In other words, the ramp repetition rate is identical with the scan line rate at the recording medium. The ramp signal is arranged to return to zero before the next start of scan signal is detected. This ensures that the laser beam will be on the correct facet.

The output of the ramp generator is applied to a voltage controlled oscillator 53. The oscillator generates the signal of constant amplitude with frequency (acoustic carrier frequency) dependent upon the voltage level applied from the ramp generator. The output of the voltage controlled oscillator is illustrated by the waveform in FIG. 4c. A waveform illustrating the electrical video signal stream applied to the control circuit 50 is illustrated in FIG. 4d. This video signal stream amplitude modulates the acoustic carrier from the voltage controlled oscillator in mixer 52. The output of mixer 52 is shown in FIG. 4e. This signal (modulated carrier) is amplified by amplifier 51 and then applied as a drive signal to the modulator transducer 31.

The drive signal (FIG. 4e) contains an amplitude component which varies the intensity of the first-order beam in accordance with the information contained in the electrical video signal. In addition, the variable frequency information contained in the drive signal causes the angle of diffraction to change in proportion to the frequency.

Figure 5A:
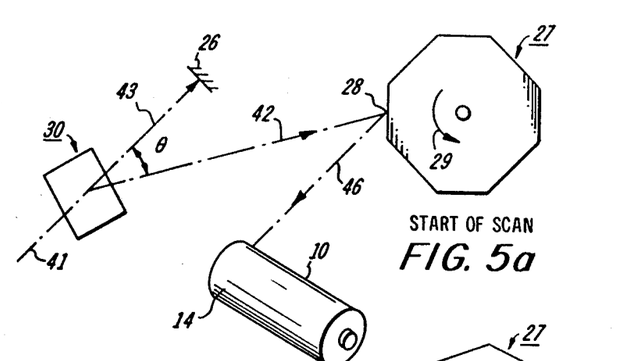
FIGS. 5a–c are partial schematic diagrams for use in explaining the facet tracking of the present invention.
Figure 5B:
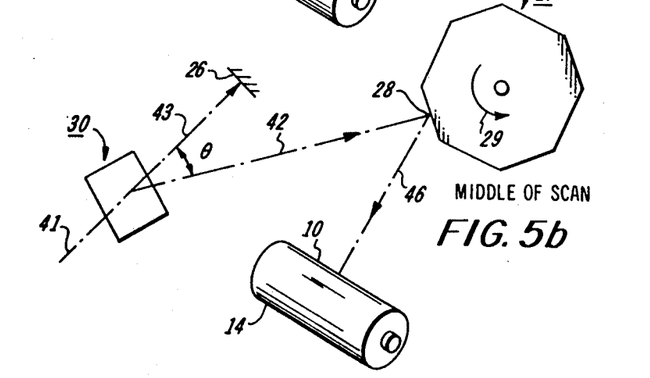
Figure 5C:
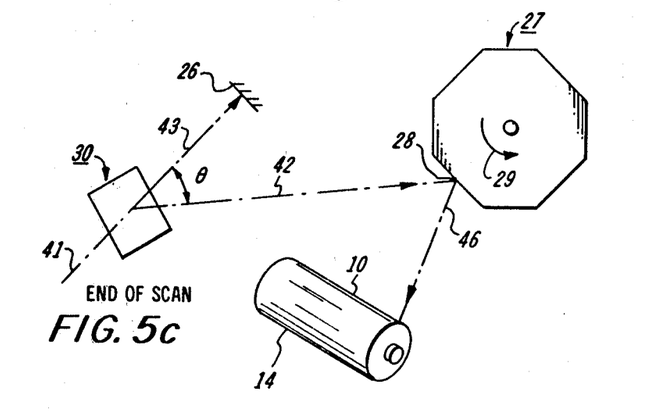

The change in the angle of diffraction at varying points along scan line 10 is illustrated in FIG. 5. FIG. 5a shows the start of the scan. FIG. 5b shows the middle of the scan. FIG. 5c shows the end of the scan. As can be seen, the angle of diffraction increases from the start to the end of the scan. This is as expected since, as stated before, the angle of diffraction is proportional to the frequency of the drive signal applied to the transducer. It is possible to configure the system such that polygon 27 rotates in the clockwise direction. In this case, the frequency sweep is arranged to go from a high to a low value.

As can be seen, the output drive signal combines frequency modulation of the first-order beam. The output of the ramp generator 54 is chosen such that the frequency output of the voltage controlled oscillator 53 when mixed with the electrical video signal provides a drive signal which causes the first-order beam to track the mirrored facet 28 during the rotation and translation of the facet during the scan. In essence, therefore, the frequency modulation of the carrier signal causes the position of the light beam at the polygon to shift in time, tracking the motion of the polygon facet. A the end of a scan, as the scan spot nears the edge of the the photoreceptor, the carrier frequency is caused to return to its initial value, causing the light beam position at the polygon to shift to the next adjacent facet in preparation to start the next scan line. The frequency modulation of the carrier causes negligible change in the position of the light beam spot at the photoreceptor since the light beam spot 17 is imaged from the modulator onto the photoreceptor. The light beam effectively "pivots" about the center of the modulator. The amplitude modulation of the carrier causes the light to switch on and off, in response to the video signal stream. The combination of this with the scanning introduced by the polygon, causes an exposure profile on the photoreceptor which is a replica of the video signal.

Figure 2:
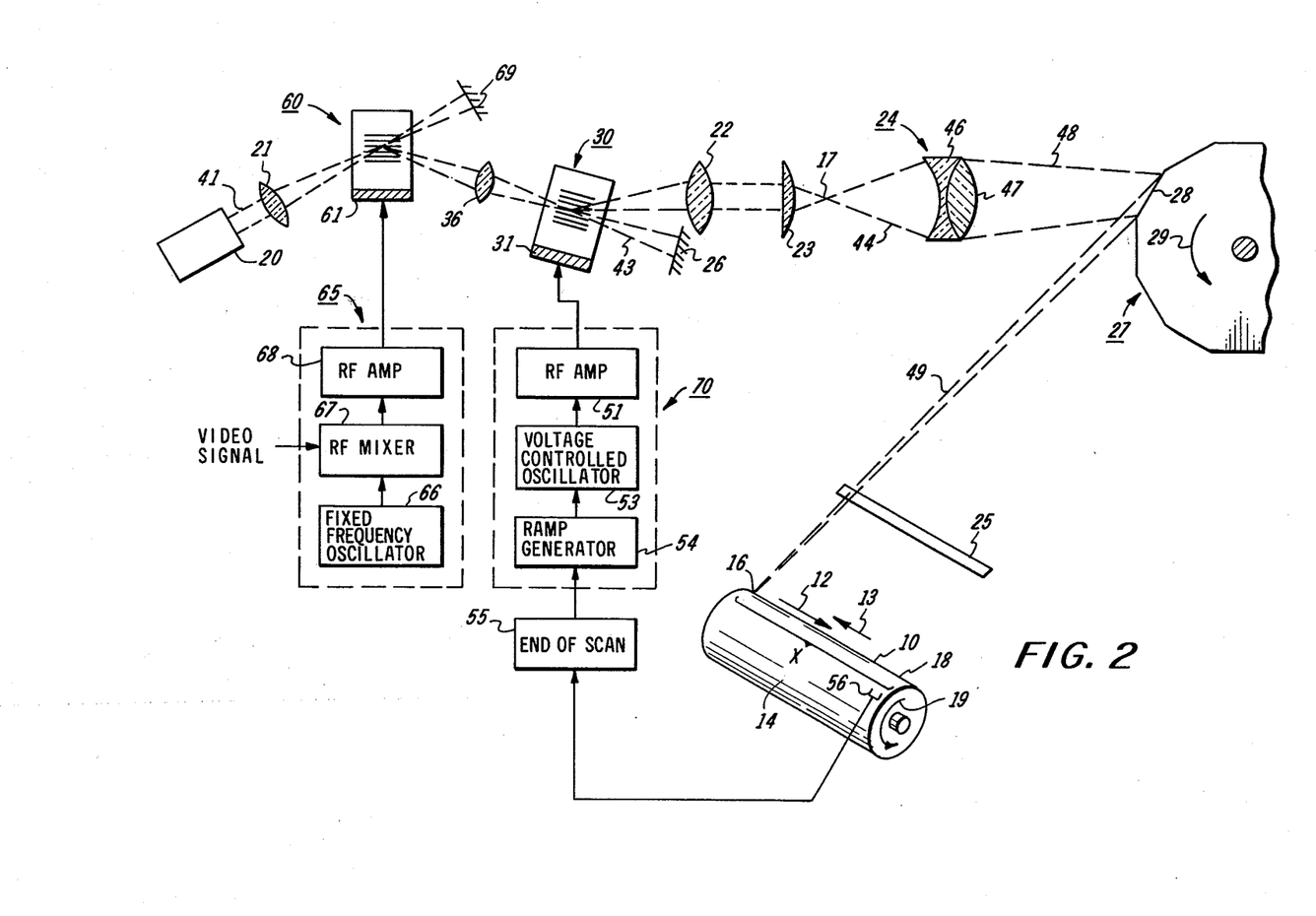
FIG. 2 is a partial schematic diagram of an additional embodiment of the optical scanning system of the present invention at the start of scan position.

An alternative embodiment may be utilized which uses an acousto-optic modulator 60 to modulate the light beam 41 in accordance with the information contained in an electrical video signal supplied to control circuit 65. In the control circuit, a fixed frequency oscillator 66 provides an output of constant amplitude and constant frequency (FIG. 4f) which is mixed with the electrical video signal (FIG. 4d) in mixer 67. The output of the mixer is amplified by amplifier 68 and then used as the drive signal (FIG. 4g) to the transducer 61. The output beam of the modulator 60 may be either the zero-order beam or the first-order beam, since the intensity of either beam is a function of the amplitude of the drive signal applied to the transducers 61.

The output beam of modulator 60 is applied to Bragg cell 30 via focusing lens 36. The operation of control circuit 70 is similar to that of control circuit 50 with the exception that the output of the voltage controlled oscillator 53 is not mixed with an electrical video signal but is directly applied via amplifier 51 as a drive signal to the transducer 31. The output of the voltage controlled oscillator (FIG. 4c) is a signal of constant amplitude with frequency dependent upon the voltage level applied by the ramp generator 54 as previously described. The intensity of the first order output beam is constant because the amplitude of the drive signal is constant. The angle of diffraction behaves in the same manner as previously described with respect to FIG. 1. The output of the ramp generator is chosen such that the frequency output of the voltage controlled oscillator causes the first order beam to track the facet 28 as the facet is rotated and translated during the scan.

In accordance with the further teachings of the present invention acousto-optic modulator 30 (FIGS. 1 and 2 embodiments) which is utilized for facet tracking is also required for the pulse imaging configuration. Further, optical elements 22, 23 and 24 are arranged to image an object in modulator 30 onto the surface of recording medium 14. The acousto-optic modulator 30 (in the FIGS. 1 and 2 embodiments) for pulse imaging must be orientated in a predetermined manner. In particular, modulator 30 is oriented so that the acoustic field travels in a plane parallel to the scan direction plane (or optical equivalent thereof). The modulator 30 is also oriented so that the image of the acoustic field which is projected onto the photoreceptor 14 travels in a direction anti-parallel (opposite) to the scan motion introduced by the rotating polygon mirror 27. Further, the system optical magnification between modulator 30 and recording medium 14 along the scan direction 12 is selected to be equal to or near the ratio:

$$V_{scan}/V_{sound}$$

where $V_{scan}$ is the scan speed of the laser beam scanning across the surface of recording medium 14 (scanning caused by polygon rotation) and wherein $V_{sound}$ is the speed of sound inside the modulator 30. Optimum resolution occurs when the magnification is at or near this value, the technique being successful for other magnifications albeit with decrease in resolution performance.

From the above summary, it can be recognized that the facet tracking and pulse imaging concepts can be combined with a minimum of change in the elements required for implementing each concept separately while providing an optimized system which utilizes the best features of each concept. The following further details the pulse imaging aspect of the present invention.

Figure 6:
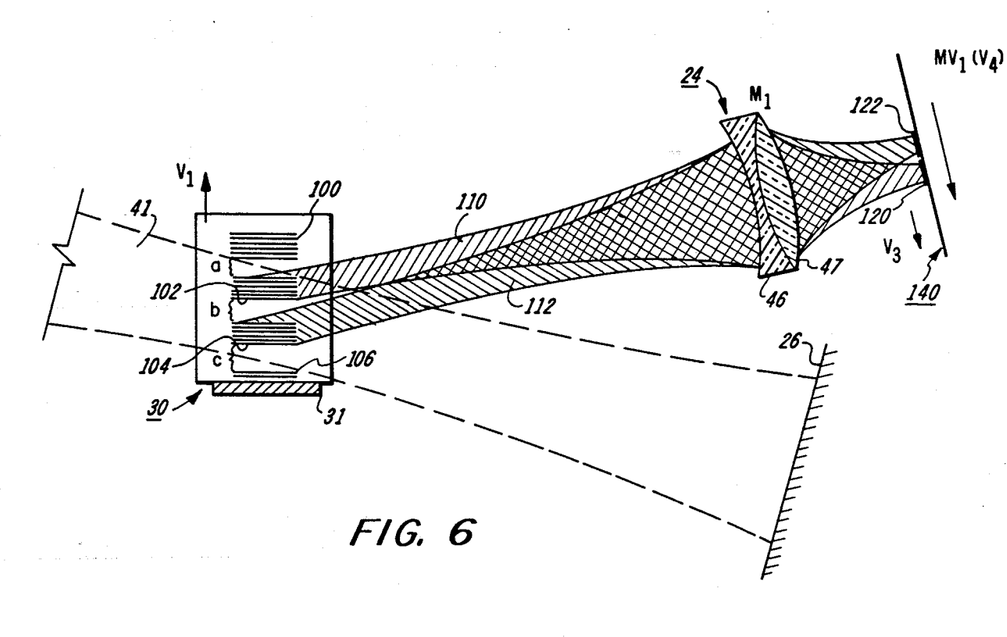
FIG. 6 shows in a simplified representation two acoustic pulses illuminated by an input laser beam and imaged onto an optical data recording surface.
Figure 7A:
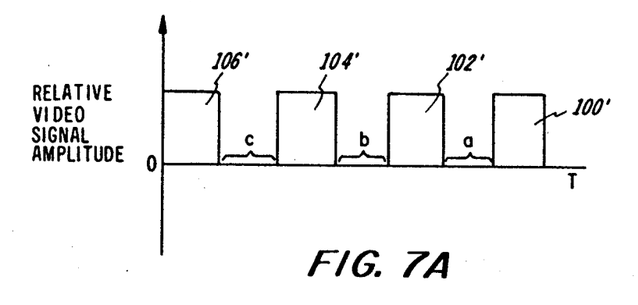
FIGS. 7a–b illustrate the formation of transformed video pulses as optical pulses on the surface of a recording medium.

FIG. 6 is a simplified representation which sets forth the particular features of the present invention. In particular, the input laser beam 41 is focused onto Bragg cell 30 and the video information is impressed upon the r-f carrier which drives the travelling wave Bragg cell in a manner described hereinabove. As is well known in the art, acoustic pulses 100, 102, 104 and 106 . . . are set up in the modulator 30 corresponding to an acoustic volume phase grating, the spacing between the wavefronts being proportional to the input signal which may be a digitized scanned input, analog video signal or from a source of data, such as a computer. In the case of a binary signal the spacing between the wavefront a, b, c . . . is proportional to the duration of a "0" signal as shown in FIG. 7(a) which may in turn correspond to the printing of no information on the laser sensitive medium. In effect, the video information (video pulses 100, 102 . . . correspond to the acoustic pulses 100, 102 . . . ) is transformed into coded segments of the acoustic volume phase grating produced by the data, or video, modulated RF carrier signal. Modulator 30 is orientated with respect to other system elements (such as folding mirrors which are not shown) so that the acoustic field travels in the proper direction with respect to the surface of the recording medium. In the case of the FIGS. 1 and 2 embodiments, the acoustic field travels in the direction of reference arrow 13 anti-parallel to the scan direction (or optical equivalent thereof). In other words, the acoustic field moves anti-parallel to the direction that the writing laser beam is caused to move relative to the recording medium. Incoming video beam 41, in the case illustrated, has a sufficient width in the direction of sound propagation, indicated by the arrow labeled $V_1$, representing the sound wave velocity, to encompass two coded segments or "bits" (102 and 104) of the acoustic volume phase grating although more or less coded segments could be illuminated. The more coded segments illuminated, the better the resolution of the data recorded. Preferably, between one and two coded segments are illuminated. The coded segments 102 and 104 transform the incident laser beam 41 into separate optical beams 110 and 112, respectively, which move at the velocity of the phase grating within modulator 30. The optical element 24 is positioned relative to acousto-optic modulator 30 such that the deflected beams 110 and 112 are incident thereon and imaged as pulses 120 and 122, respectively, onto the surface of recording medium 140.

Figure 7B:
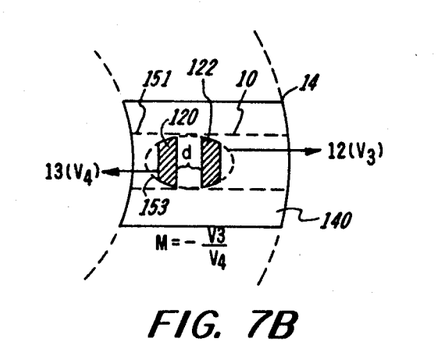

The element 140 shown in FIG. 6 represents the surface of a medium sensitive to laser flux incident thereon and may represent, for example, a xerographic member, such as a xerographic drum. In this case, the velocity of the recording medium 140 at the area wherein a scanning laser beam may be incident is essentially zero in the direction of scan (reference numeral 12 shown in FIG. 1). FIG. 7(b) further illustrates the pulse imaging aspects of the present invention and shows in enlarged form a portion of the scanline 10 being formed on xerographic drum 14 and the beam 49 imaged thereon. The beam 49 at the surface 140 at the time when the acoustic wavefront interacts with the laser beam comprises coded optical pulses 120 and 122, the individual wavefronts in the modulator 30 not being resolved since the first order light is blurred to some extent. The spacing d between pulses 120 and 122 is proportional to the spacing between acoustic pulses 102 and 104 which in turn is equal to the product of the velocity of sound in the modulator 30 to the time interval of the marking video pulse. The width of the pulses 120 and 122 in the sagittal direction is determined by the shape of the laser beam interacting with the sheet of sound formed in the acousto-optic medium and the magnification of optical element 24 and lens elements 22 and 25 in the sagittal direction. The width of the sound sheet 151, the laser beam shape, or envelope 153 and the acoustic pulses 120 and 122, as scaled by the magnification provided by optical element 24, is illustrated in the figure. Since the beam 50 is caused to scan xerographic medium 10 in the direction of scanline 12 at a velocity $V_3$, the velocity of the drum in that direction being essentially zero, it is required that the pulses 120 and 122 move in the opposite direction (reference numeral 13) at a speed $V_4$ such that the image formed on the drum appears stationary, or immobilized, as the information is being printed on the drum in order to minimize image blur. In this regard, modulator 30 is orientated so that the image of the acoustic field (pulses) which is projected on the surface of medium 14 travels in a direction 13 anti-parallel to the scan motion introduced by the rotating polygon mirror 27. Although not illustrated, as the laser beam 49 continues to scan across the surface of xerographic drum 14, additional acoustic pulses will be imaged onto the surface of xerographic drum 14 synchronized to the video information to be reproduced, an individual scanline thereby being formed. Additional scan lines are formed in accordance with video information to be reproduced using known scanning techniques.

It should be noted that FIG. 7(b) illustrates the situation wherein the video pulse is of a relatively short duration (i.e. 10 nanoseconds) such that the optical pulses or segments 120 and 122 are formed within the envelope 153 of the laser beam. If the video pulse is of a longer duration such that the width of the corresponding optical pulse segment extends beyond the envelope 153, the acousto-optic pulse imaging system of the present invention still provides the desired results since the marking cycle, when completed, will provide the same exposure or mark due to the time of exposure which occurs.

The optical pulses 120 and 122 are shown at a particular instant of time, additional optical pulses being produced as the acoustic pulses are generated in medium 30.

Referring to FIG. 6, each of the coded segments 102 and 104 produce corresponding optical pulses 120 and 122, respectively, the separation between the acousto-optic pulse images corresponding to the separation between the segmented coded pulses 102 and 104. In essence, the light output from modulator 30 is broken up into spatial instead of temporal segments.

Acousto-optic interaction occuring in the region of acoustic pulses 102 and 104 cause the input light to be diffracted, the undiffracted or zero order light being absorbed, in the embodiment illustrated, by zero order stop member 26. The first order diffracted light is diffracted by the moving acoustic grating to optical element 24 which projects the optical beams 110 and 112 onto medium 140 as optical pulses 120 and 122, respectively.

The recording medium illustrated is a xerographic medium as shown in FIG. 1 wherein the scanning direction is orthogonal to the direction of rotation of the drum. If the system magnification M between the acousto-optic modulator 30 and the surface of the photoreceptor is selected such that $-MV_1 = V_3$ wherein $V_1$ is the acoustic velocity in the medium 30, $V_3$ is the relative velocity of the laser scanning beam in the direction of scan (velocity effects in the direction of drum rotation are negligible) which can be measured, for example, by utilizing start of scan detector 56 and an end of scan detector (not shown), the image 120 and 122 of acoustic pulses 102 and 104, respectively, follows the velocity of the scanning beam in the opposite direction (relative velocity $MV_1$ of imaged acoustic pulses 120 and 122 with respect to the photoreceptor is substantially zero) and thereby permits an isomorphic mapping of the video signal to the surface of the recording medium with minimized blurring since the velocity of the medium in the direction of scan is substantially zero. The minus sign in front of the above relationship indicates that the optical elements between the acousto-optic modulator 30 and the surface of the recording medium should be selected such that the pulses are travelling, in the appropriate sequence, in a direction opposite to the scanning direction as exemplified in FIG. 7(b). It should be noted that in the actual system, each of the optical elements may contribute to system magnification other than optical element 24. The system of the present invention is designed so that the system optical magnification is of the proper value to make pulses 120 and 122 immobilized on the surface of the recording medium. A technique to ensure that the system optical magnification, after the system has been built, is of the proper value is to monitor the contrast ratio of the recorded images while adjusting lens magnification. To exemplify the above relationship, the acoustic compressional wave velocity $V_1$ may be calculated to be approximately $4.25 \times 10^5$ cm/sec for a $TeO_2$ acousto-optic modulator. For a scanning beam velocity of 2500 cm/sec, the system magnification between modulator 30 and the recording surface should be:

$$-M = \frac{V_3}{V_1} = \frac{2500 \text{ cm/sec}}{4.25 \times 10^5 \text{cm/sec}} = \frac{1}{170.4}$$

Therefore, the velocity of the pulse images 120 and 122 at the recording medium surface is approximately 2500 cm/sec. It should be noted that it has been determined that the best performance of the system occurs when $V_3/V_1 = -M$. However, it has been further determined that even if the magnification M can not be adjusted exactly to that ratio but is within around 10% of that value, the resolution characteristics of the optical data recording system will still be improved over the uncompensated system.

It should be noted that the image velocity vector, which is a change of length in a unit time, can be increased or decreased linearly by the magnification factor M. Further, the magnification of an optical system can be different in the sagittal direction (direction orthogonal to direction of scan) and tangential direction (direction parallel to direction of scan). Since the blurring effect would be most apparent in the direction of scan, the magnification relationship set forth hereinabove is for the direction of scan.

As noted, a problem of motion blur can occur whenever writing a stream of high density data bits on a recording medium. In the case of optical data recording, practically attainable rise and fall times of modulator 30 are often not short enough to produce the short pulses required to produce the desired hole (bit) size, thus causing significant loss of writing spot definition due to the movement of the writing beam across the surface of the recording medium 14 thereby causing blurring of the recorded data. Another disadvantage in being required to provide extremely short laser pulse widths (i.e. short duty cycle, duty cycle being defined as the ratio of the laser pulse width to the repetition wdith) in order to minimize image blur as would be required in prior art systems would be that the amount of energy coupled to the recording medium surface would be reduced, resulting in the necessity of providing lasers having higher power capability which increases overall system cost. Further, the prior art systems utilizing continuous wave lasers would be inefficient since the laser beam is utilized for a small portion of the laser on time.

In accordance with the invention, motion blur is eliminated or minimized by the use of optical element 24 in the optical path between modulator 30 and the surface of recording medium 14 as described hereinabove.

In accordance with the pulse imaging concept of the present invention, it has been recognized that the video signal information which is required at the surface of the recording medium already exists within the acousto-optic modulator. In particular, the usual perception of an acousto-optic Bragg cell is that of a device which solely modulates in time the power of a light beam. The acousto-optic Bragg cell also modulates the spatial profile of the light beam. This latter capability minimizes image blur by tracking the moving recording surface with a moving image of the video signal stream. The spatial modulation is defined by the overlap of the light beam profile with the moving acoustic video signal stream (in essence, the packets of sound energy inside the modulator constitute a series of "windows" flowing past the light beam, successively exposing various segments of the laser light profile). This modulated light profile is then imaged onto the recording surface via appropriate optical elements so that the moving segments of light travel at the same speed in the opposite direction as the laser beam scanning across the surface of recording medium 14. The acoustic video stream does not have the required dimensional scaling but in all other respects it is a faithful reproduction of the desired video image. The scaling is corrected by imaging the acoustic pulses onto the recording surface with the appropriate magnification provided by the optical elements interposed between the acousto-optic modulator and the surface of the recording medium.

FIG. 8 shows, in more detail, the development of an image formed on the xerographic drum shown in FIGS. 1 and 2. In particular, medium 10 may be a xerographic drum which rotates consecutively through a charging station depicted by corona discharge device 190, exposure station 192 where the beam from the rotating polygon 27 traverses the scan width x on the drum 14, through developing station 194 depicted by a cascade development enclosure, transfer station 196 where a web of copy paper is passed in contact with the drum 14 and receives an electrostatic discharge to induce a transfer of the developed image from the drum 14 to the copy paper. The copy paper is supplied from the supply reel 198, passes around guide rollers 200 and through drive rollers 202 into receiving bin 204. A fusing device 206 fixes the images to the copy paper as is passes to bin 204.

Usable images are provided in that the information content of the scanning spot is represented by the modulated or variant intensity of light respective to its position within the scan width x. As the spot traverses the charged surface 192 through a given scan angle, the spot dissipates the electrostatic charge in accordance with its light intensity. The electrostatic charge pattern thus produce is developed in the developing station 194 and then transferred to the final copy paper. The xerographic drum 14 is cleaned by some cleaning device such as a rotating brush 208 before being recharged by charging device 190. In this manner, the information content of the scanned spot in order to utilize the information contained therein such as the optical disc referred to hereinabove. The polygon 27 is continuously driven by motor 210 and synchronized in rotation to a synchronization signal representative of the scan rate used to obtain the original video signal. The rotation rate of the xerographic drum 14 determines the spacing of the scan lines. It also may be preferably to synchronize the drum 14 in some manner to the signal source to maintain image linearity.

Another significant advantage of utilizing pulse imaging scanning in combination with facet tracking over prior art scanners concerns appropriate illumination of the limiting aperture to achieve maximum resolution. The limiting aperture in the embodiments of FIGS. 1 and 2 is the polygon facet 28. Standard scanner design theory teaches that resolution performance is governed by the convolution of the video signal stream with "impulse response" of the scanner. This "impulse response" is the spatial intensity profile of the scan spot (16 in FIG. 1). Optimum resolution occurs when this spot is most compact. The scan spot will be most compact when the limiting aperture (facet 28 in FIG. 1) is uniformly illuminated.

Because the laser beam profile is not uniform, but typically Gaussian, the uniform illumination of the limiting aperture can only be approximated by overfilling the limiting aperture with laser light as shown, for example, in the aforementioned U.S. Pat. No. 3,922,485. However, only a fraction of the light energy, typically less than 50%, falls within the limiting aperture of the scanner optics. Therefore, the light throughput efficiency of the scanner cannot be better than 50%.

In contradistinction thereto, the pulse imaging scanner of the present invention exhibits its best resolution performance when the light beam incident upon the limiting aperture subtends only a fraction of this aperture i.e. an underfilled condition. This configuration has inherently high light capture at the limiting aperture, and hence significantly greater light throughput efficiency. In particular, resolution does not degrade because of FM blur wherein the light intensity profile grows in width with more rapid video signal fluxtuations.

Because of FM blur, the limiting aperture can be underfilled for quiescent video signals, and filled for rapidly varying video signals. This allows a far more favorable tradeoff between light capture and resolution. In particular, the resolution performance of the pulse imaging scanner is governed by the relative dimensional scaling between the quiescent (steady state video signal applied to the modulator) light profile and the limiting aperture. If the quiescent light severly overfills the aperture (a low light throughput efficiency configuration), then the resolution performance will be equal to the prior art scanners. In the opposite extreme, when the quiescent light profile subtends a small fraction of the aperture, then resolution performance is increased greatly. Therefore, the pulse imaging scanner provides a range of video signal operating frequencies wherein resolution is greatly improved over the prior art scanners and wherein its performance is at least equal to the prior art scanners at higher operating ranges.

While the invention has been described with reference to its preferred embodiments, it will be understood by those skilled in the art, that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. An improved flying spot scanning system for recording information from an electrical signal onto a scanned medium comprising:
   means for providing a beam of radiant energy;
   means for generating a signal representing the start or end of a scan;
   a Bragg diffraction light-sound interaction medium including a transducer coupled to an acoustic wave transmitting medium characterized by a predetermined acoustic wave propagation velocity, said medium both modulating and deflecting said beam in accordance with the information content of a drive signal applied thereto,
   scanning means having at least one reflective surface positioned in the optical path of said modulated and deflected beam for scanning said beam across said scanned medium by rotating said reflective surface a desired angle to impart the information content of said beam to said scanned medium;
   means responsive to the start or end of a scan signal and said electrical signal for providing said drive signal, said drive signal causing said beam to track said reflective surface during the rotation and translation of said reflective surface during said scan, said drive signal being coupled to said transducer for also propagating intensity-modulated acoustic waves in said medium at a predetermined velocity, said beam of radiant energy being projected through said medium in a direction transverse to said acoustic waves to produce in said medium a moving image of information corresponding to said electrical signal, said image moving at said predetermined velocity, and
   optical means interposed in the path of said intensity modulated beam and having magnification M associated therewith, for minimizing image blur on a recording medium said moving image being projected onto said scanned medium with said beam in a manner such that the velocity of said moving image is substantially equal to and in an opposite direction as the velocity of said scanning beam.

2. The system as defined in claim 1 wherein said scanned medium comprises a rotating xerographic member.

3. The system as defined in claim 2 wherein the magnification M is selected such that M is substantially equal to $V_3/V_1$ wherein M is the system magnification between the interaction medium and said scanned medium, $V_3$ is the velocity of the beam spot scanning across the surface of said scanned medium, and $V_1$ is said predetermined velocity.

4. The system as defined in claim 1 wherein said beam providing means comprises a laser.

5. The system of claim 1 wherein said drive signal means includes:
   first means for providing an output signal of constant amplitude and a frequency dependent upon a voltage applied to its input;
   means responsive to the start or end of scan signal for generating said input voltage, said input voltage being proportional to the distance travelled by said reflective surface during a scan; and
   means for processing said electrical signal and said output signal to provide said drive signal.

6. The system of claim 1 wherein the scanning means includes a multifaceted polygon having reflective facets for reflecting the radiant energy incident to it onto said medium and means for rotating said polygon such that the reflected light is scanned in successive traces across said medium.

7. The system as defined in claim 1 wherein the modulation and deflection of said beam is accomplished simultaneously.

8. The system of claim 1 wherein said beam tracks a discrete area of said reflective surface.

9. The system of claim 5 wherein said voltage input comprises a linear ramp whose duration corresponds substantially to the time required to scan one trace.

10. The system as defined in claim 1 wherein the magnification M is the magnification in a direction parallel to the direction of scan.

11. An improved flying spot scanning system for recording information from an electrical signal onto a scanned medium comprising:
   means for providing a beam of radiant energy;
   means for generating a signal representing the start or end of scan;
   a Bragg diffraction light-sound interaction medium including a transducer coupled to an acoustic wave transmitting medium characterized by a predetermined acoustic wave propagation velocity, said medium modulating said beam in accordance with the information content of said electrical signal applied thereto,
   deflecting means positioned to receive said modulated beam and for deflecting said beam in accordance with a first electrical signal applied thereto,
   scanning means having at least one reflective surface positioned in the optical path of said modulated and deflected beam for scanning said beam across said medium by rotating said scanned reflective surface a desired angle to impart the information content of said beam to said scanned medium;
   means responsive to the start or end of scan signal for providing said first electrical signal, said first electrical signal causing said beam to track said reflective surface during the rotation and translation of said reflective surface during said scan, said electrical signal being coupled to said transducer for propagating intensity-modulated acoustic waves in said medium at a predetermined velocity, said beam being projected through said medium in a direction transverse to said acoustic waves to produce in said medium a moving image of information corresponding to said electrical signal, said image moving at said predetermined velocity, and
   optical means interposed in the path between said intensity modulated and deflected beam and having a magnification M associated therewith, for minimizing image blur on a recording medium said moving image being projected onto said scanned medium with said beam in a manner such that the velocity of said moving image is substantially equal to and in an opposite direction as the velocity of said scanning beam.

12. The system as defined in claim 11 wherein said scanned medium comprises a rotating xerographic member.

13. The system as defined in claim 12 wherein the magnification M is selected such that M is substantially equal to $V_3/V_1$ wherein M is the system magnification between the interaction medium and said scanned medium, $V_3$ is the velocity of the beam spot scanning across the surface of said scanned medium and $V_1$ is said predetermined velocity.

14. The system as defined in claim 11 wherein said beam providing means comprises a laser.

15. The system of claim 11 wherein said drive signal means for providing said first electrical signal includes:
   first means for providing an output signal of constant amplitude and a frequency dependent upon a voltage applied to its input; and
   means responsive to the start or end of scan signal for generating said input voltage, said input voltage being proportional to the distance travelled by said reflective surface during a scan.

16. The system of claim 11 wherein the scanning means includes a multifaceted polygon having reflective facets for reflecting the radiant energy incident to it onto said medium and means for rotating said polygon such that the reflected light is scanned in successive traces across said medium.

17. The system as defined in claim 11 wherein said beam tracks a discrete area of said reflective surface.

18. The system of claim 11 wherein said first electrical signal comprises a linear ramp whose duration corresponds substantially to the time required to scan one trace.

19. The system as defined in claim 10 wherein the magnification M is the magnification in a direction parallel to the direction of scan.

* * * * *